US010489341B1

(12) United States Patent
Lin et al.

(10) Patent No.: US 10,489,341 B1
(45) Date of Patent: Nov. 26, 2019

(54) FLEXIBLE INTERCONNECT PORT CONNECTION

(71) Applicant: QUANTA COMPUTER INC., Taoyuan (TW)

(72) Inventors: Fa-Da Lin, Taoyuan (TW); Pin-Hao Hung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/016,886

(22) Filed: Jun. 25, 2018

(51) Int. Cl.
*G06F 15/17* (2006.01)
*G06F 13/40* (2006.01)
*G06F 15/78* (2006.01)
*G06F 15/80* (2006.01)

(52) U.S. Cl.
CPC .......... *G06F 15/17* (2013.01); *G06F 13/4004* (2013.01); *G06F 13/4068* (2013.01); *G06F 15/7803* (2013.01); *G06F 15/80* (2013.01)

(58) Field of Classification Search
None
See application file for complete search history.

(56) References Cited

U.S. PATENT DOCUMENTS

| | | | |
|---|---|---|---|
| 6,065,069 A | 5/2000 | Klein | |
| 7,664,823 B1 * | 2/2010 | Wakerly | G06F 15/163 709/211 |
| 8,867,216 B2 * | 10/2014 | Bingi | G06F 13/409 174/250 |
| 9,192,052 B2 * | 11/2015 | Bingi | G06F 13/409 |
| 9,261,897 B2 * | 2/2016 | Kim | G06F 1/04 |
| 9,660,364 B2 * | 5/2017 | Wig | H01R 12/53 |
| 10,152,446 B2 * | 12/2018 | Iyer | G06F 13/4068 |
| 10,229,080 B2 | 3/2019 | Song et al. | |

(Continued)

FOREIGN PATENT DOCUMENTS

| | | |
|---|---|---|
| CN | 105528199 A | 4/2016 |
| CN | 107113994 A | 8/2017 |

(Continued)

OTHER PUBLICATIONS

'Drilling Down Into the Xeon Skylake Architecture' by Timothy Prickett Morgan, Aug. 4, 2017. (Year: 2017).*

(Continued)

*Primary Examiner* — Steven G Snyder
(74) *Attorney, Agent, or Firm* — Nixon Peabody LLP; Zhou Lu

(57) ABSTRACT

A computing device can flexibly connect bidirectional processor interconnect ports (BPIPs). An exemplary computing device includes a motherboard structure, a first processor, a second processor, and a plurality of connectors disposed on the motherboard structure. The first processor and the second processor can each have at least three BPIPs. A first and second of BPIPs of the first processor can be connected to a first and second BPIPs of the second processor. A third BPIP of the first processor and a third BPIP of the second processor can be connected to a first one and a second one of the plurality of connectors. The plurality of connectors can be connected to a computing card. In some examples, the computing device includes a switching element to selectively couple the connectors to any other element in the computing device.

8 Claims, 7 Drawing Sheets

(56) References Cited

U.S. PATENT DOCUMENTS

| | | |
|---|---|---|
| 2006/0067066 A1 | 3/2006 | Meier et al. |
| 2007/0156938 A1 | 7/2007 | Wu et al. |
| 2007/0294454 A1 | 12/2007 | Danilak |
| 2012/0258611 A1* | 10/2012 | Bingi .................. G06F 13/409 439/55 |
| 2013/0311817 A1* | 11/2013 | Kim ........................ G06F 1/04 713/501 |
| 2014/0059266 A1* | 2/2014 | Ben-Michael ........ G06F 13/385 710/313 |
| 2014/0106582 A1* | 4/2014 | Wig ...................... H01R 12/53 439/78 |
| 2015/0034363 A1* | 2/2015 | Bingi .................. G06F 13/409 174/250 |
| 2016/0179710 A1* | 6/2016 | Das Sharma ....... G06F 13/4068 710/310 |
| 2018/0004703 A1* | 1/2018 | Sharma .............. G06F 13/4282 |
| 2018/0019953 A1 | 1/2018 | Odisho et al. |
| 2018/0024960 A1 | 1/2018 | Wagh et al. |
| 2018/0095923 A1* | 4/2018 | Iyer .................... G06F 13/4068 |
| 2018/0234486 A1* | 8/2018 | Kumar .................... H04L 67/10 |
| 2019/0005176 A1* | 1/2019 | Illikkal .............. G06F 17/5027 |
| 2019/0042292 A1* | 2/2019 | Palermo .............. G06F 9/45529 |
| 2019/0042326 A1* | 2/2019 | Chilikin ................ G06F 9/5077 |
| 2019/0042518 A1* | 2/2019 | Marolia .............. G06F 13/4221 |
| 2019/0094926 A1* | 3/2019 | Subramanian ........ G06F 1/3206 |

FOREIGN PATENT DOCUMENTS

| | | | |
|---|---|---|---|
| CN | 107396586 A | * | 11/2017 |
| CN | 107408095 A | | 11/2017 |
| CN | 107436860 A | * | 12/2017 |
| CN | 107766282 A | * | 3/2018 |
| CN | 108959158 A | * | 12/2018 |
| RU | 162375 U1 | * | 6/2016 |
| TW | 200801977 A | | 1/2008 |
| TW | 201235856 A | | 9/2012 |

OTHER PUBLICATIONS

'Intel Xeon Processor Scalable Family Technical Overview' by David Mulnix, Jul. 10, 2017. (Year: 2017).*

'Intel QPI—System Architecture' from qdpma, archived on Dec. 30, 2017. (Year: 2017).*

'An Introduction to the Intel QuickPath Interconnect' Jan. 2009, Intel Corporation. (Year: 2009).*

'CN 107766282 A English Machine Translation from Google' CN107766282A filed Oct. 27, 2017, published Mar. 6, 2018. (Year: 2018).*

TW Office Action for Application No. 107133217, dated May 27, 2019, w/ First Office Action Summary.

TW Search Report for Application No. 107133217, dated May 27, 2019, w/ First Office Action.

Extended European Search Report for EP Application No. 18207459. 1, dated May 24, 2019.

TW Office Action for Application No. 107133217, dated Sep. 12, 2019, w/ Second Office Action Summary.

TW Search Report for Application No. 107133217, dated Sep. 12, 2019, w/ Second Office Action.

\* cited by examiner

FLEXIBLE INTERCONNECT PORT CONNECTION

FIELD

The present invention relates to systems for flexibly connecting bidirectional processor interconnect ports (BPIPs) in a computing device.

BACKGROUND

Computer systems can have multiple processors to increase their computing power. Processors need to communicate with each other to assign and allocate computing tasks. A first processor typically communicates with a second processor via BPIPs on the first processor that can be wired to BPIPs on the second processor. These processors' BPIPs can provide for high speed connections with low data loss rates and low latency.

Many processors have multiple BPIPs. Some computer systems require all of these ports to be wired between the processors in order to provide quick enough communication between the processors. This typically occurs in a computer system where the number of ports on each processor is at least equal to the number of processors in the server. However, when the number of ports on each processor is greater than the number of processors in the server, only a portion of the BPIPs are used, and some ports remain disconnected and idled.

SUMMARY

The various examples of the present disclosure are directed towards a computing device configured to flexibly connect BPIPs in a computing device. An exemplary computing device, according to an embodiment of the present disclosure, includes a motherboard structure, a first processor, a second processor, and a plurality of connectors disposed on the motherboard structure. The first processor and the second processor are both disposed on the motherboard structure, and include at least three BPIPs. The motherboard structure can have a plurality of lanes. The plurality of lanes can comprise a first, second, third, and fourth set of lanes. The first set of lanes can interconnect a first of the at least three BPIPs of the first processor to a first of the at least three BPIPs of the second processor. The second set of lanes can interconnect a second of the at least three BPIPs of the first processor to a second of the at least three BPIPs of the second processor. The third set of lanes can interconnect a third of the at least three BPIPs of the first processor to one or more first ones of the plurality of connectors. The fourth set of lanes can interconnect a third of the at least three BPIPs of the second processor to one or more second ones of the plurality of connectors.

In some examples, the computing device can further comprise a cable structure connecting the first ones of the plurality of connectors to the second ones of the plurality of connectors.

In some examples, the one or more first ones of the plurality of connectors and the one or more second ones of the plurality of connectors can each comprise at least one transmit path connector and at least one receive path connector. The cable structure can further comprise at least a first cable and a second cable. The first cable can connect the at least one transmit path connector of the one or more first ones of the plurality of connectors to the at least one receive path connector of the one or more second ones of the plurality of connectors. The second cable can connect the at least one receive path connector of the one or more first ones of the plurality of connectors to the at least one transmit path connector of the one or more second ones of the plurality of connectors.

In a first embodiment, the computing device can further comprise a computing card disposed on the motherboard. The computing card can have a plurality of card connectors. The computing device can also have a first cable structure and a second cable structure. The first cable structure can connect the first ones of the plurality of connectors to one or more first ones of the plurality of card connectors. The second cable structure can connect the second ones of the plurality of connectors to one or more second ones of the plurality of card connectors.

In some examples of the first embodiment, the one or more first ones of the plurality of connectors and the one or more second ones of the plurality of connectors each comprise at least one transmit path connector and at least one receive path connector.

In some examples of the first embodiment, the plurality of card connectors can comprise a plurality of connector pairs. Each of the plurality of connector pairs can comprise at least one transmit card connector and at least one receive card connector. The first cable structure can comprise a first cable connecting the at least one transmit path connector of the one or more first ones of the plurality of connectors to the at least one receive card connector of a first of the plurality of the connector pairs. The first cable structure can also comprise a second cable connecting the at least one receive path connector of the one or more first ones of the plurality of connectors to the at least one transmit card connector of the first of the plurality of connector pairs. The second cable structure can comprise a third cable connecting the at least one transmit path connector of the one or more second ones of the plurality of connectors to the at least one receive card connector of a second of the plurality of connector pairs. The second cable structure can also comprise a fourth cable connecting the at least one receive path connector of the one or more second ones of the plurality of connectors to the at least one transmit card connector of the second of the plurality of connector pairs.

In some examples of the first embodiment, the computing card can comprise a field programmable gate array card.

In other examples of the present disclosure, the at least three BPIPs of the first processor and the at least three BPIPs of the second processor can each comprise an Ultra Path Interconnect (UPI) port.

In other examples of the present disclosure, the computing device can comprise a switching element coupled to the plurality of connectors and configured for selectively coupling the third of the at least three BPIPs of the first processor to the third of the at least three BPIPs on the second processor.

The words "computer system," "computing system," "computing device," and "server system" are all used interchangeably in this present disclosure, and can be used to identify any electronic computing system that can use a fan to cool overheating electronic components. Such an electronic computing system can include, but not be limited to, a personal computer, a laptop computer, a tablet, and a commercial or private server system.

The words "lanes," "signal traces," and "connection technology" are all used interchangeably in this present disclosure, and can be used to identify any sort of communication lane in a computer system, including signal traces, cables, or any other sort of connection technology, without limitation.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
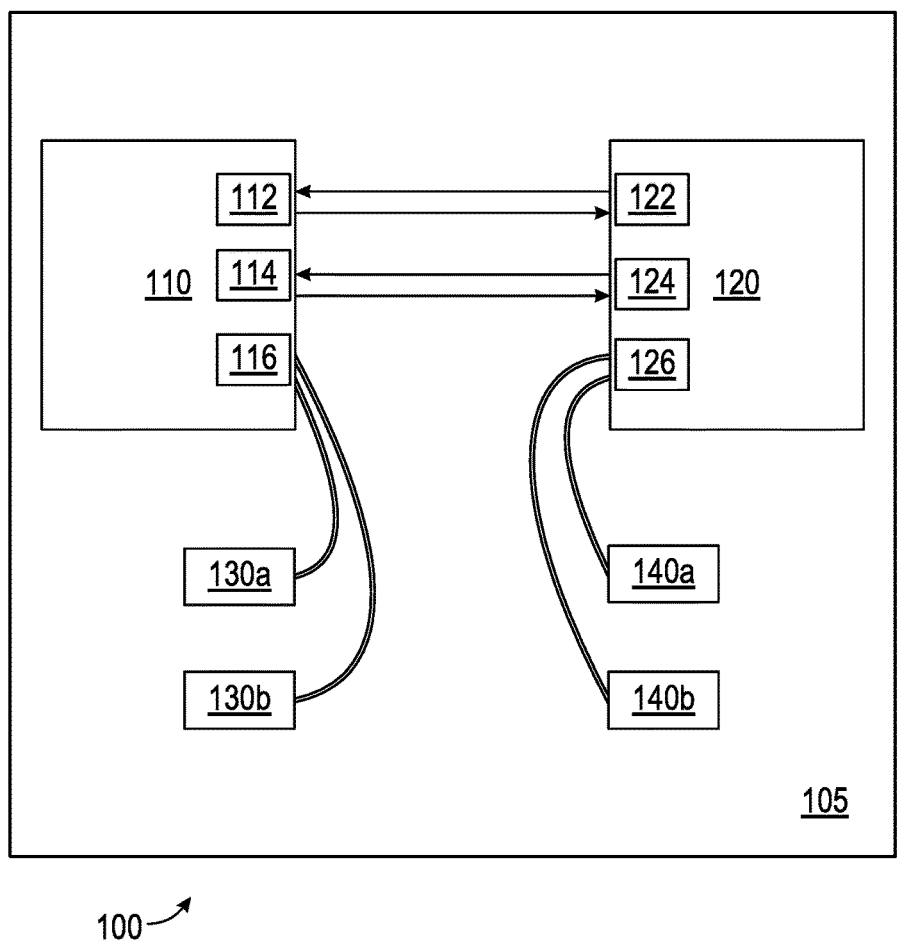
FIG. 1 shows a schematic diagram of an exemplary computing system where a third port on two processors is connected to a connector element, according to an embodiment of the present disclosure.

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure is directed to flexibly connecting BPIPs of a first processor and a second processor in a computing device. Flexible connections allow the processors to use as many BPIPs as needed for communication between the processors. Any remaining in BPIPs can connect to connector elements and be used to optionally connect between the processors or between each processor and an external card. A switching element can be provided for to selectively couple BPIPs between the processors. The various connections can be provided for through traces on a motherboard structure of a computing device or via cable structures. For example, a computer system can have two processors with three BPIPs each. Two BPIPs of each processor can be connected to the other processor. The third BPIP of each processor can be coupled to a switching device which selectively couples the third BPIPs to the other processor. Alternatively, or in addition, the third BPIP of each processor can be connected to an external card.

The computing device provides for advantages over conventional processes. Particularly, a computing device allows for a flexible decision about which BPIPs to engage, based on the structure of the computing device. For example, the third BPIPs of the first and second processor can be configured to connect to each other, to a plurality of connectors, or to a computing card. Therefore, the present application provides a more flexible computing system such that if a customer does not want to use a computing card, the customer can connect the third BPIP between the first and second processor to provide higher bandwidth for the computing system.

FIG. 1 shows a schematic diagram of an exemplary computing system 100, according to an embodiment of the present disclosure. The computing system 100 can include a system motherboard 105 supporting a first processor 110 with three BPIPs 112, 114, and 116 and a second processor 120 with three BPIPs 122, 124, and 126. In this example, BPIP 112 can connect to BPIP 122. BPIP 114 can connect to BPIP 124. In a conventional arrangement, if the third BPIP (116 and 126) of each processor (110 and 120, respectively) is unneeded, then the third BPIP remains disconnected and idle.

Because each BPIP in each of the processors is bidirectional, each BPIP can have a transmit path and a receive path. The transmit path and the receive path can occur through sets of signal traces on a system motherboard. Each set of signal traces can include one or more signal traces. For example, the transmit path and the receive path for each port can each include twenty lanes of communication. Alternatively, instead of using signal traces, the connections can occur through cables or any other type of connection technology without limitation.

The BPIPs 112, 114, 116, 122, 124, and 126 can be endpoints of communication in a computer system and can be reserved for specific types of communication. In some embodiments of the present disclosure, the BPIPs 112, 114, 116, 122, 124, and 126 can be Ultra Path Interconnect (UPI) ports or any other type of BPIPs for processor. UPI ports have the advantage of providing low-latency connections for multiprocessor systems with a shared address space. UPI ports can also provide high transfer speed of up to 10.4 GT/s. However, the present disclosure is not limited to any particular type of BPIP.

As shown in FIG. 1, the system 100 is configured to include connector elements 130a, 130b, 140a, and 140b connected (directly or via other components) to unconnected ports 116 and 126. These connector elements 130a, 130b, 140a, and 140b can be separate from the first processor 110 and the second processor 120 and can be disposed on system motherboard 105. For example, as shown in FIG. 1, ports 116 and 126 are not connected to another processor in the exemplary system 100. Therefore, ports 116 and 126 can connect to the connector elements 130a, 130b, 140a, and 140b. In such a configuration, the connector elements 130a, 130b, 140a, and 140b provide flexible connection scheme for connecting the BPIPs 116 and 126 and other component in computer system 100.

Connections to the connector elements 130a, 130b, 140a, and 140b can be bidirectional and occur through either signal traces on system motherboard 105, through cables, or any other type of connection technology without limitation. The connector elements 130a, 130b, 140a, and 140b can be configured as a receiving element or a transmitting element such that each BPIP connects to both a receiving connector element and a transmitting connector element. For example, connector elements 130a and 140a can be connector receiving elements. Connector elements 130b and 140b can be connector transmitting elements.

FIG. 1 therefore shows a computing system 100 that is unique from the conventional systems through connection of connector elements 130a, 130b, 140a, and 140b to the normally unused BPIPs 116 and 126 of the first processor 110 and the second processor 120, respectively. These connector elements 130a, 130b, 140a, and 140b allow flexibility for configuring computing system 100. In particular, the computing system provides different options, i.e. flexibility, for utilizing the normally unused third BPIPs 116 and 126. This is discussed below in greater detail with respect to FIGS. 2A, 2B. 3A, 3B, 4A, and 4B.

Figure 2A:
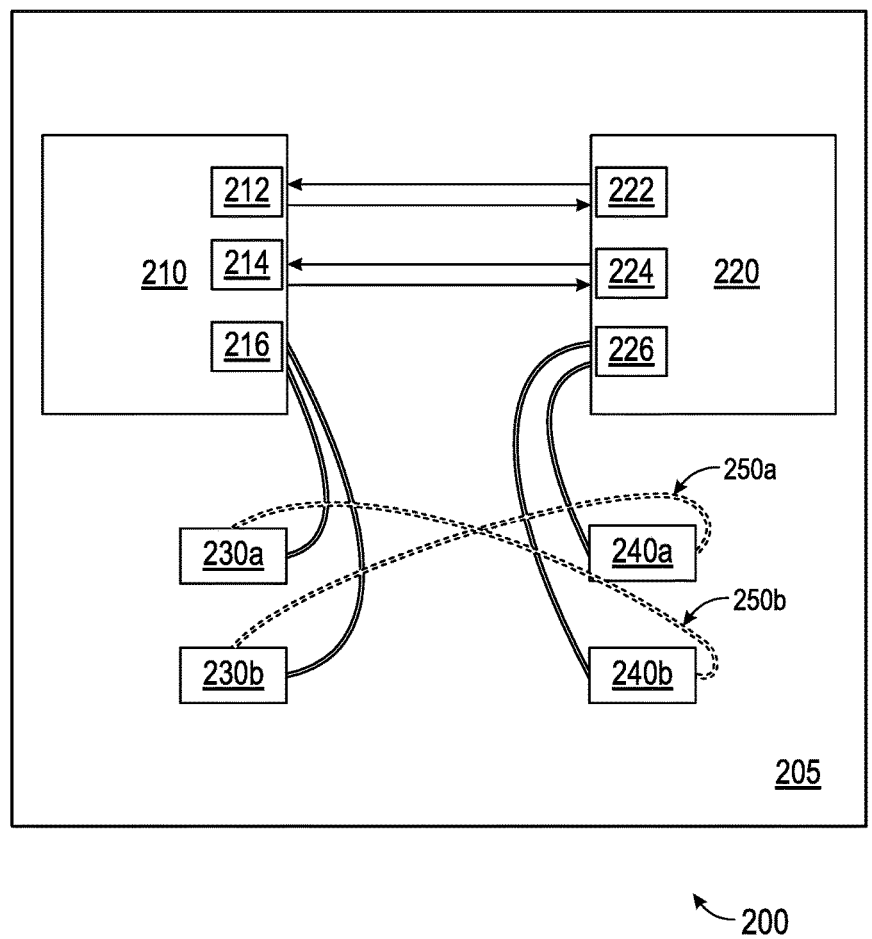
FIG. 2A shows a schematic diagram of an exemplary computing system where connector elements of two processors are connected to each other, according to an embodiment of the present disclosure.

Turning now to FIG. 2A, there is shown a schematic diagram of an exemplary computing system 200 where all BPIPs of two processors are connected to each other, according to an embodiment of the present disclosure. FIG. 2A includes similar structures and features as FIG. 1, including a system motherboard 205, a first processor 210 with three BPIPs 212, 214, and 216; a second processor 220 with three BPIPs 222, 224, and 226; and connector elements 230a, 230b, 240a, and 240b. Accordingly, the explanation above with respect to FIG. 1 of components corresponding to components in FIG. 2 is sufficient for understanding these components in FIG. 2.

In addition to those elements mirroring the elements in FIG. 1, system 200 also includes connecting cables 250a and 250b. The connecting cables 250a and 250b can be configured to connect a receiving connector element to a transmitting connector element in order to complete connections between ports 216 and 226. For example, connector element 230b can be a receiving connector element and can be connected to connector element 240a, which can be a transmitting connector element. Thereby, the first processor 210 can be configured to receive transmissions from the second processor 220, and the second processor 220 can be configured to send transmissions to the first processor 210. Similarly, connector element 230a can be a transmitting connector element and can be connected to connector element 240b, which can be a receiving connector element. The connections between the connector elements 230a, 230b, 240a, and 240b can occur through cables or any other type of connection technology without limitation.

Figure 2B:
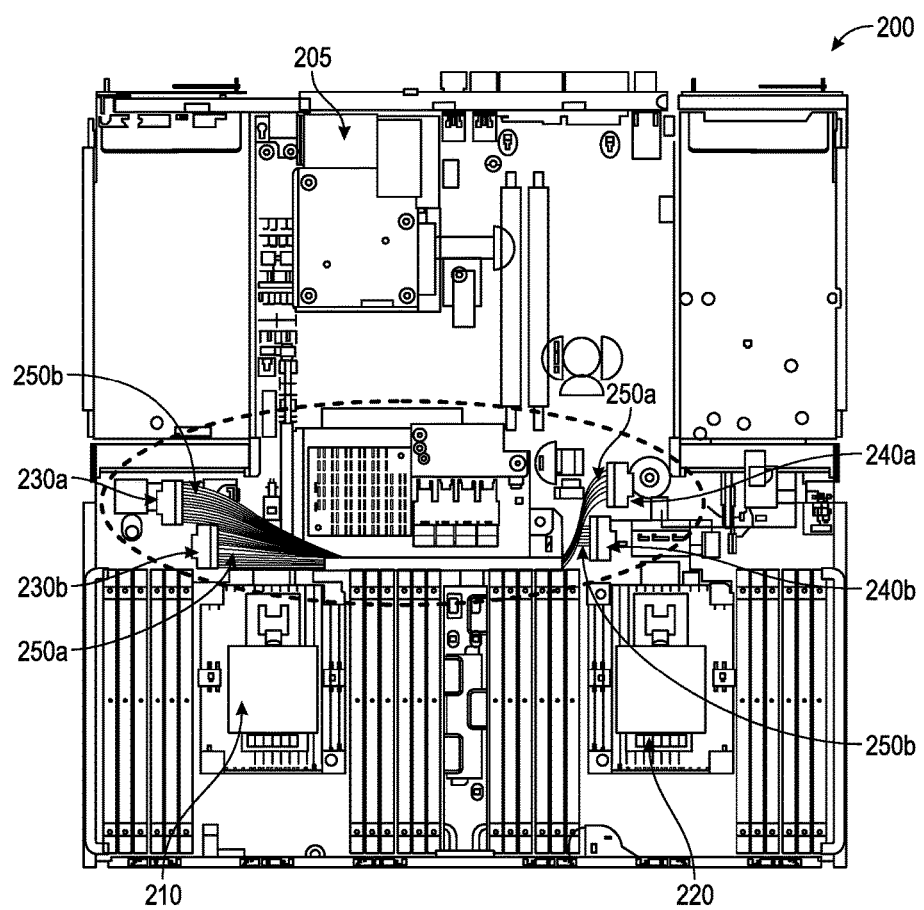
FIG. 2B shows a top view of an exemplary computing system where connector elements of two processors are connected to each other, according to an embodiment of the present disclosure.

FIG. 2B shows a top view of an exemplary computing device 200 where the computer components are connected in the manner provided for by FIG. 2A. The computing device 200 includes a motherboard 205; a first processor 210 with three BPIPs 212, 214, and 216 (from FIG. 2A); a second processor 220 with three BPIPs 222, 224, and 226 (from FIG. 2A); connector elements 230a, 230b, 240a, and 240b (from FIG. 2A); and connecting cables 250a and 250b. Connecting cables 250a and 250b can be configured to connect connector elements 230a, 230b, 240a, and 240b. Thereby, the first processor 210 and the second processor 220 can communicate with each other via cables 250a and 250b.

FIG. 2A-2B therefore show how a computing system can use all three UPI ports to communicate between the processors when additional communication support is needed by the computer system. However, in circumstances where the third ports of the processors are not needed for additional communication support, FIG. 1 shows that the UPI connectors can instead be used to connect the processors to other components in a computer system. This is illustrated in FIGS. 3A and 3B.

Figure 3A:
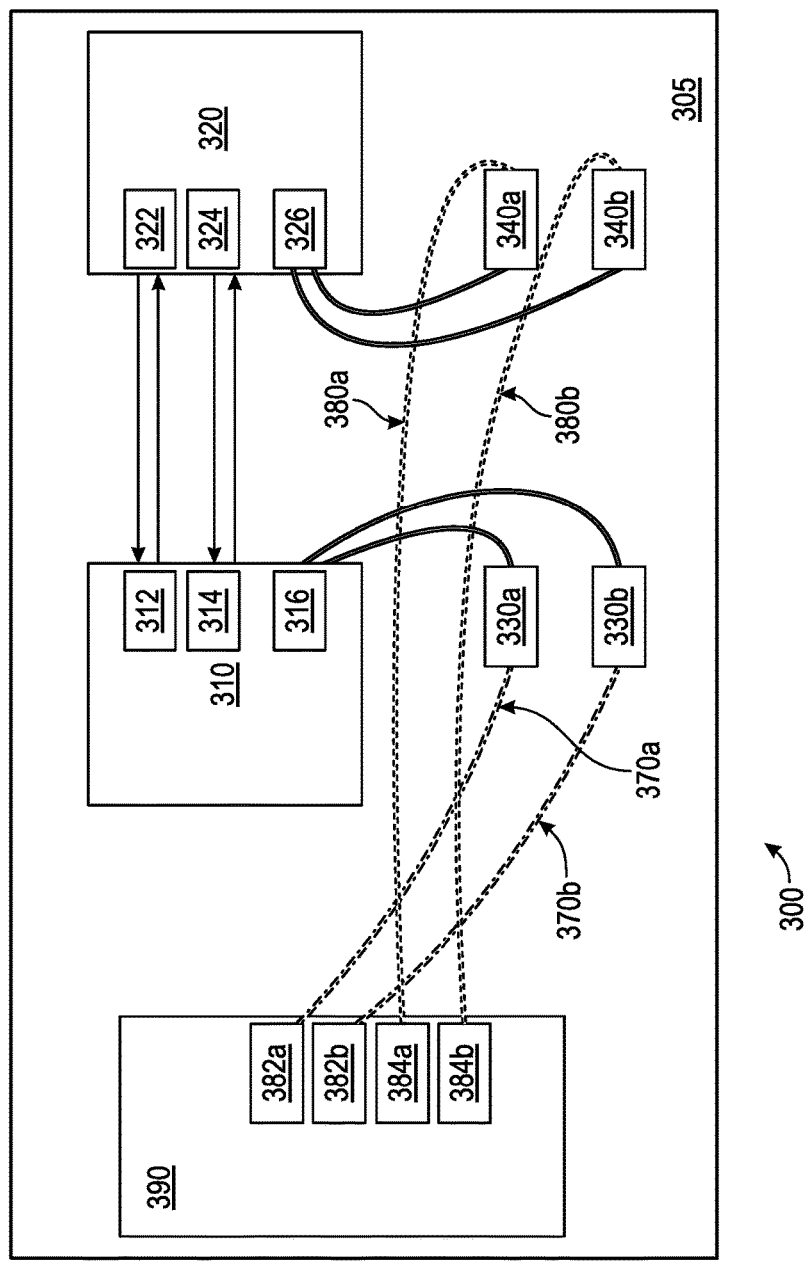
FIG. 3A shows a schematic diagram of an exemplary computing system where connections between BPIPs on a pair of processors are connected to a computing card, according to an embodiment of the present disclosure.
Figure 3B:
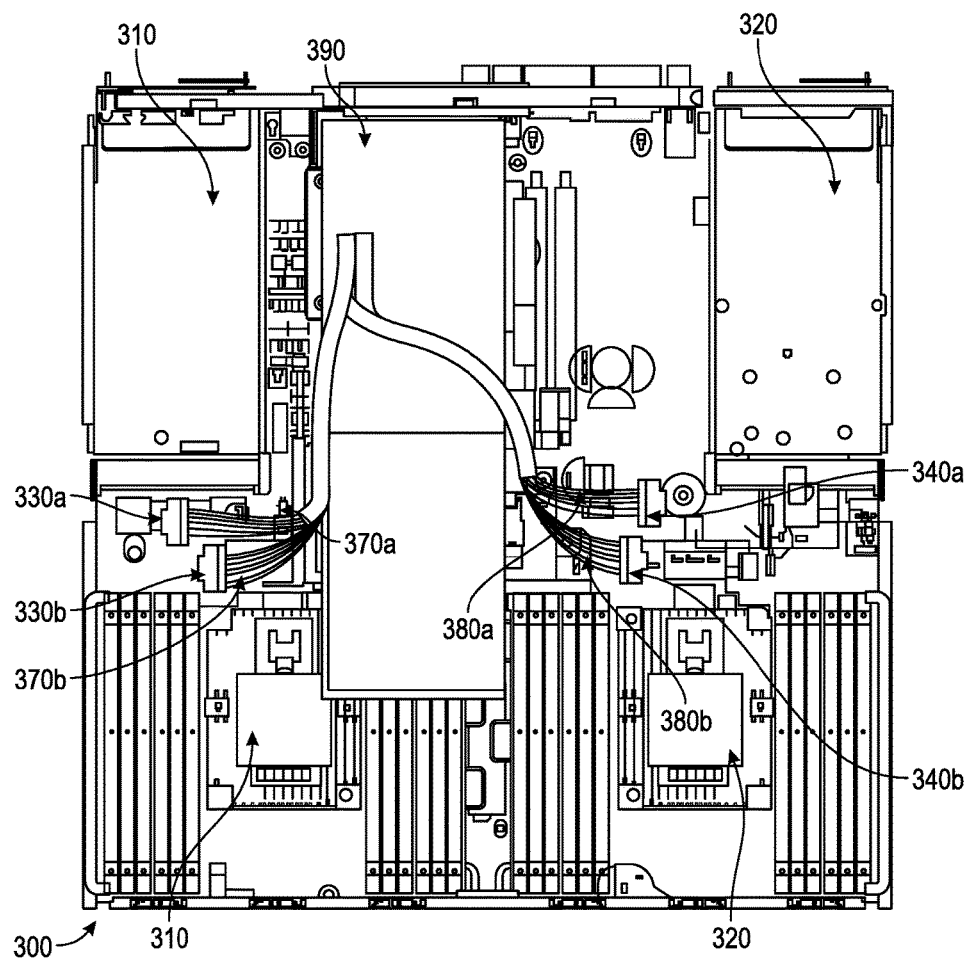
FIG. 3B shows a top view of an exemplary computing system where connections between BPIPs on a pair of processors are connected to an external card, according to an embodiment of the present disclosure.

FIG. 3A shows a schematic diagram of an exemplary computing system 300 where connections between BPIPs on a pair of processors are connected to a computing card, according to an embodiment of the present disclosure. FIG. 3A includes similar structures and features as FIG. 1, including a system motherboard 305; a first processor 310 with three BPIPs 312, 314, and 316; a second processor 320 with three BPIPs 322, 324, and 326; and connector elements 330a, 330b, 340a, and 340b. Accordingly, the explanation above with respect to FIG. 1 of components corresponding to components in FIG. 3 is sufficient for understanding these components in FIG. 3.

In addition to those elements mirroring the elements in FIG. 1, system 300 of FIG. 3A includes a computing card 390, with computing card ports 382a, 382b, 384a, and 384b. The computing card can be any type of daughterboard or other type of computing card. The computing card can include ports 382a, 382b, 384a, and 384b can be connected to the connector elements 330a, 330b, 340a, and 340b via cable elements 370a, 370b, 380a, and 380b.

Connections can be provided between the processors such that BPIP 312 can connect to BPIP 322. BPIP 314 can connect to BPIP 324. Ports 316 and 326 can connect to the connector elements 330a, 330b, 340a, and 340b. The connector elements 330a, 330b, 340a, and 340b allow flexible connection between the BPIPs 316 and 326 and any other computer component, including the computing card 390. The computing card ports 382a, 382b, 384a, and 384b of the computing card 390 can be transmit ports and receive ports. For example, computing card port 382b can be a receive port and can be connected via cable element 370b to connector element 330b, which can be a receiving connector element. Thereby, the computing card 390 can be configured to receive transmissions from the first processor 310. Similarly, computing card port 382a can be a transmit port and can be connected via cable element 370a to connector element 330a, which can be a transmitting connector element. Thereby, computing card 390 can be configured to transmit communication to the first processor 310.

The second processor 320 can be configured to send and receive transmissions from the computing card 390 in the same manner as the first processor 310. For example, computing card port 384b can be a receive port and can be connected via cable element 380b to connector element 340b, which can be a receiving connector element. Thereby, the computing card 390 can be configured to receive transmissions from the second processor 320. Similarly, computing card port 384a can be a transmit port and can be connected via cable element 380a to connector element 340a which can be a transmitting connector element. Thereby, computing card 390 can be configured to transmit communication to the second processor 320.

The connections between the connector elements 330a, 330b, 340a and 340b and the computing card 390 can occur through cables or any other type of connection technology without limitation.

FIG. 3B shows a top view of an exemplary computing device 300 where the computer components are connected in the manner provided for by FIG. 3A. The computing device 300 includes a first processor 310; a second processor 320; connector elements 330a, 330b, 340a, and 340b; a computing card 390; and cable elements 370a, 370b, 380a, and 380b. FIG. 3B shows how pairs of connector elements can be configured to the computing card 390 to provide communication pathways between the first processor 310, the second processor 320, and the computing card 390 via cable elements 370a, 370b, 380a, and 380b.

As mentioned with regards to FIG. 3A, the cable elements 370a, 370b, 380a, and 380b can be configured to connect a receiving connector element to a receiving computing card port. For example, computing card port 382b can be a receive port and can be connected via cable element 370b to connector element 330b, which can be a receiving connector element. Thereby, the computing card 390 can be configured to receive transmissions from the first processor 310. Similarly, computing card port 382a can be a transmit port and can be connected via cable element 370a to connector element 330a, which can be a transmitting connector element. Thereby, computing card 390 can be configured to transmit communication to the first processor 310.

Therefore, FIGS. 3A-3B show how a computing system according to the present disclosure can connect a first and second processor to a computing card. Connecting the first and second processor to the computing card improves the efficiency of the computing system, because the computing card can quickly communicate with the processor when carrying out complex computational functions.

As discussed above, conventional processor arrangements do not provide for such ease of communication between the computing card and the processors.

Figure 4A:
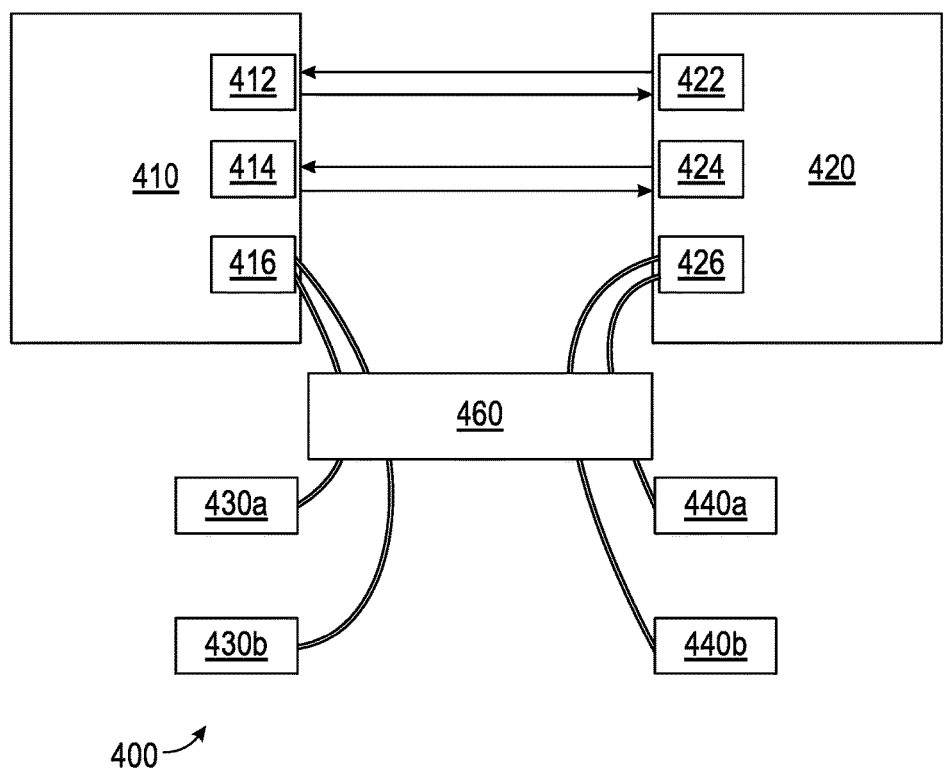
FIG. 4A shows a schematic diagram of an exemplary computing system where connections between BPIPs on a processor and connector elements are controlled by a switching element, according to an embodiment of the present disclosure.

FIG. 4A shows a schematic diagram of an exemplary computing system 400 where connections between BPIPs on a processor and a connector element are controlled by a switching element, according to an embodiment of the present disclosure. FIG. 4A includes similar structures and features as FIG. 1, including a first processor 410 with three BPIPs 412, 414, and 416; a second processor 420 with three BPIPs 422, 424, and 426; and connector elements 430a, 430b, 440a, and 440b. In addition to those elements mirroring the elements in FIG. 1, system 400 includes a switching element 460.

The switching element 460 can be coupled to the connector elements 430a, 430b, 440a, and 440b so as to selectively allow communication between the first processor 410, the second processor 420, and the connector elements 430a, 430b, 440a, and 440b. For example, if the switching element is not coupled, then the first processor 410 cannot transmit signals to the connector elements 440a and 440b. Similarly, the second processor 420 cannot transmit signals to the connector elements 430a and 430b. When the switching element is coupled, the first processor 410 can transmit signals to the connector elements 440a and 440b. The second processor 420 can transmit signals to the connector elements 430a and 430b as well.

Figure 4B:
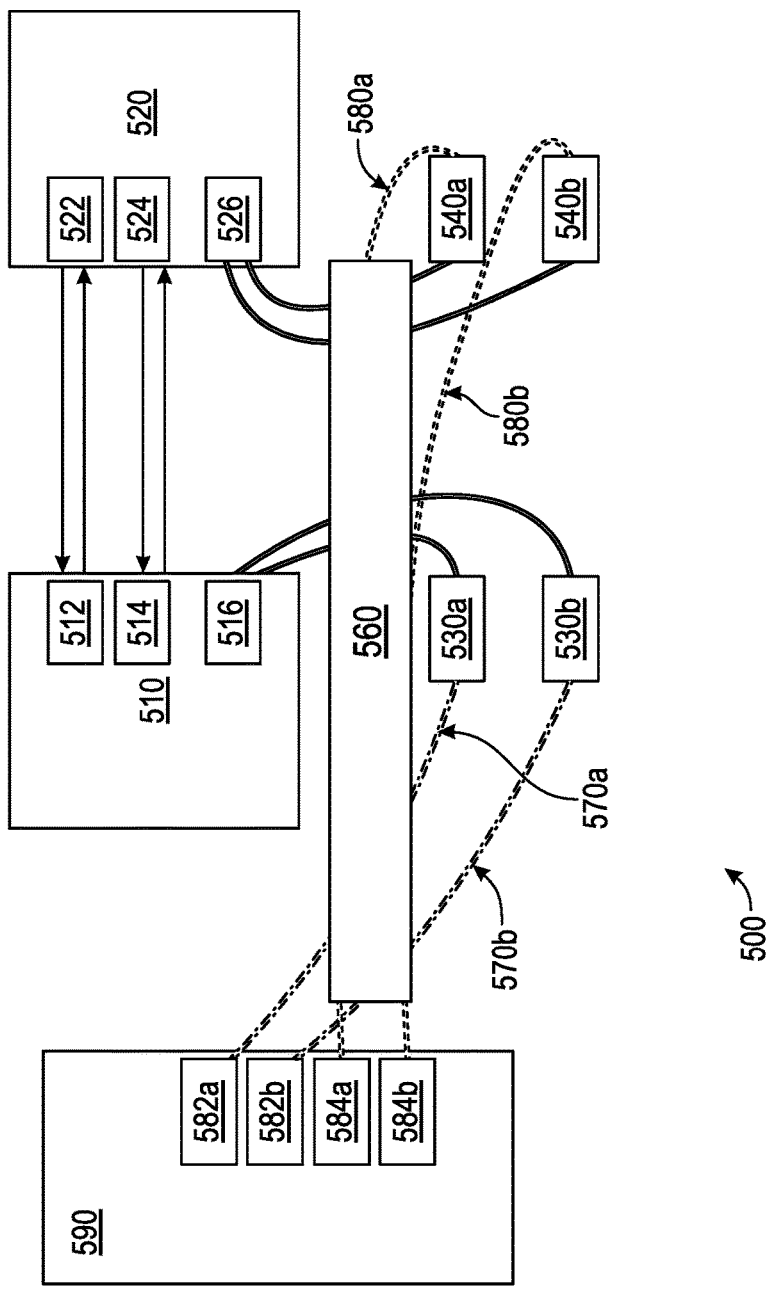
FIG. 4B shows a schematic diagram of an exemplary computing system where connections between BPIPs on a processor, connector elements, and a computing card are controlled by a switching element, according to an embodiment of the present disclosure.

In another example, FIG. 4B shows a schematic diagram of an exemplary computing system 500, where connections between BPIPs on a processor, connector elements, and a computing card are controlled by a switching element, according to an embodiment of the present disclosure. FIG. 4B contains similar structures and features as FIG. 3A, including a first processor 510 with three BPIPs 512, 514, and 516; a second processor 520 with three BPIPs 522, 524, and 526; and connector elements 530a, 530b, 540a, and 540b. In addition to those elements mirroring the elements in FIG. 3A, system 300 of FIG. 4B includes a computing card 590, with computing card ports 582a, 582b, 584a, and 584b. The computing card ports 582a, 582b, 584a, and 584b can be connected to the connector elements 530a, 530b, 540a, and 540b, via cable elements 570a, 570b, 580a, and 580b.

The switching element 560 can be coupled to the connector elements 530a, 530b, 540a, and 540b, so as to selectively allow communication between the first processor 510, the second processor 520, and the computing card 590. For example, if the switching element is not coupled, then the first processor 510 cannot transmit signals to the connector elements 530a and 530b. Similarly, the second processor 520 cannot transmit signals to the connector elements 540a and 540b. Therefore, the first processor 510 and the second processor 520 cannot transmit or receive signals from the computing card 590. When the switching element is coupled, the first processor 510 can transmit signals to the connector elements 530a and 530b. The second processor 520 can transmit signals to the connector elements 540a and 540b as well. Therefore, the first processor 510 and the second processor 520 can transmit or receive signals from the computing card 590.

FIGS. 4A-4B demonstrate superiority over conventional computer systems because conventional computer systems do not use the combination of a switching element and processor BPIPs to selectively couple a third port of a processor to a connector element or a computing card.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computing device comprising:
a motherboard structure with a plurality of lanes;
a first processor disposed on the motherboard structure, the first processor having at least three bidirectional processor interconnect ports (BPIPs);
a second processor disposed on the motherboard structure, the second processor having at least three BPIPs; and
a plurality of connectors disposed on the motherboard structure,
wherein the plurality of lanes comprise a first set of lanes interconnecting a first of the at least three BPIPs of the first processor to a first of the at least three BPIPs of the second processor, a second set of lanes interconnecting a second of the at least three BPIPs of the first processor to a second of the at least three BPIPs of the second processor, a third set of lanes interconnecting a third of the at least three BPIPs of the first processor to one or more first ones of the plurality of connectors, and a fourth set of lanes interconnecting a third of the at least three BPIPs of the second processor to one or more second ones of the plurality of connectors;
a computing card disposed on the motherboard structure, the computing card having a plurality of card connectors;
a first cable structure; and
a second cable structure,
wherein the first cable structure connects the first ones of the plurality of connectors to one or more first ones of the plurality of card connectors, and wherein the second cable structure connects the second ones of the plurality of connectors to one or more second ones of the plurality of card connectors,
wherein the plurality of card connectors comprise a plurality of connector pairs, each of the plurality of connector pairs comprising at least one transmit card connector and at least one receive card connector, and
wherein, the first cable structure comprises a first cable connecting the at least one transmit path connector of the one or more first ones of the plurality of connectors to the at least one receive card connector of a first of the plurality of connector pairs and a second cable connecting the at least one receive path connector of the one or more first ones of the plurality of connectors to the at least one transmit card connector of the first of the plurality of connector pairs, and
wherein, the second cable structure comprises a third cable connecting the at least one transmit path connector of the one or more second ones of the plurality of connectors to the at least one receive card connector of a second of the plurality of connector pairs and a fourth cable connecting the at least one receive path connector of the one or more second ones of the plurality of connectors to the at least one transmit card connector of the second of the plurality of connector pairs.

2. The computing device of claim 1, further comprising a cable structure connecting the first ones of the plurality of connectors to the second ones of the plurality of connectors.

3. The computing device of claim 2, wherein the one or more first ones of the plurality of connectors and the one or more second ones of the plurality of connectors each comprise at least one transmit path connector and at least one receive path connector.

4. The computing device of claim 3, wherein the cable structure further comprises at least a first cable and a second cable, the first cable connecting the at least one transmit path connector of the one or more first ones of the plurality of connectors to the at least one receive path connector of the one or more second ones of the plurality of connectors, and the second cable connecting the at least one receive path connector of the one or more first ones of the plurality of connectors to the at least one transmit path connector of the one or more second ones of the plurality of connectors.

5. The computing device of claim 1, wherein the one or more first ones of the plurality of connectors and the one or more second ones of the plurality of connectors each comprise at least one transmit path connector and at least one receive path connector.

6. The computing device of claim 1, wherein the computing card comprises a field programmable gate array card.

7. The computing device of claim 1, wherein the at least three BPIPs of the first processor and the at least three BPIPs of the second processor each comprise an Ultra Path Interconnect (UPI) port.

8. The computing device of claim 1, further comprising a switching element coupled to the plurality of connectors and configured for selectively coupling the third of the at least three BPIPs of the first processor to the third of the at least three BPIPs of the second processor.

* * * * *